United States Patent Office 3,611,732
Patented Oct. 12, 1971

3,611,732
METHOD FOR STABILIZING SILT
Michael M. Epstein, 2885 Scottwood Road,
Columbus, Ohio 43209
No Drawing. Filed July 30, 1969, Ser. No. 846,243
Int. Cl. C09k 3/08; E02d 3/12
U.S. Cl. 61—36          9 Claims

ABSTRACT OF THE DISCLOSURE

This invention is a method for stabilizing silt in the bottom of a body of water, particularly the oceans, which consists of depositing a gel of a water-soluble polymer, preferably as a coating or blanket, onto the surface of the silt while simultaneously rendering the gel water insoluble as with an insolubilizing and gelling agent.

BACKGROUND

Underwater salvage operations are frequently hampered by the presence of deposited silt. Easily disturbed by turbulence, the silt forms opaque, slow-settling clouds above the ocean floors which severely restrict divers performing complex tasks. Several possible solutions to the silt-clouding problem which have been considered and discarded include excavation and the installation of a tarpaulin-type covering.

An effective ocean bottom stabilizing system must be able to operate under a wide variety of conditions. These are:

(1) Variations in silt composition
(2) Temperature range of 28–80° F.
(3) Depth ranging from 10 to 850 feet
(4) Current velocities to 3 knots
(5) Workable in saline and nonsaline environments

THE INVENTION

I have found that bottom stabilization can be accomplished by gelling a water-soluble polymer in situ, or on the ocean floor. The gel can be used as a binder— that is, to glue the fine particles together into larger agglomerates or a more desirable approach is to bring together a solution of a water-soluble polymer and a suitable gelling agent just above the silt bed in such a way as to form a continuous layer or deposit of gel above the silt. The gel then functions as a blanket, thus immobilizing the silt.

Any water-soluble polymer that is convertible into an insoluble gel under the conditions of temperature, pressure, and salinity found in the ocean environment can be used for the process of this invention. However, it has been found that most potential systems have limited utility, and a few polymers are demonstrably superior to others. One such is the class of polysaccharides known as the alginates; sodium alginate and potassium aliginate are typical examples. These water-soluble polymers can be converted to insoluble alginic acid by combination with dilute HCl, or alternately, by reaction with calcium citrate to form the insoluble calcium alginate.

The insolubilized polymer forms a strong matte of gel. Its consistency can be varied from soft and jelly-like to hard and tough, depending upon the ratio of polymer to gelling agent and solution concentrations. When the two solutions are brought together in a wide mixing nozzle, or an appropriately designed array of nozzles, it is possible to obtain a continuous film of gel deposited on the silt. This film is capable of stabilizing or immobilizing the silt bed for an extended period. Divers may perform useful work tasks above the stabilized silt without concern about loss of visibility. In addition, the layer of gel can be made thick enough to support lightweight tools accidentally dropped by the diver.

Typically useful polymers are potassium alginate (sold commercially under the trade name Kelmar), sodium alginate (sold commercially as Keltex), and ammonium alginate. Other gellable polysaccharides have been found to be potentially useful, but not to the same extent as the alginates. These include low methoxy sodium pectinate, guar gum colloids gelled with boric acid (particularly the cationic variety), and various natural gums such as karaya, tragacanth, and carrageenin.

The alginates are usually precipitated from solutions containing two percent solids. More concentrated or more dilute solutions can be used depending upon the particular circumstances. It has been usually found convenient to vary the ratio of polymer to gelling agent from 2:1 to 1:1. The basic system can be used in both fresh and salt water environments.

Basic advantages of the alginate system are listed below:

(1) Some control of gelation time is possible
(2) Gels of vastly different characteristics can be prepared
(3) Low or high-viscosity systems can be used depending upon the requirements of particular underwater operations
(4) Effective gels can be prepared with very dilute solutions. Thus, very little polymer is required to produce a great deal of gel.

Another class of polymers that provides bottom stabilization is the polyvinyl acetate-crotonic acid copolymers. These are soluble in alkaline water solutions, and can be precipitated or gelled by reducing the solution pH to 7 or below. Very strong gels result that have proven to be very effective silt stabilizers.

In actual practice an alkaline solution containing the polyvinyl acetate copolymer is mixed with a dilute solution of hydrochloric acid in a mixing nozzle. The mixing nozzle is positioned immediately above a layer of deposited silt and is slowly moved across the ocean floor. In this manner a continuous coating gel is developed above the silt.

A variety of polyvinyl acetate-copolymer resins are available. They vary in molecular weight and degree of carboxylation. All those tested have been found to be useful. In addition to HCl, polyvalent metallic ions and amino compounds can be used to cause gellation. The strength and thickness of the deposited gel can be controlled by proper selection of the resin, resin to gelling agent ratio, solution strength, etc.

While the ocean environment has been stressed, this system will function equally well in fresh water.

Another polymer that may be used in conjunction with the method of the present invention is sodium carboxyl methyl cellulose. Sold commercially as CMC, this polymer can be precipitated from a water solution by trivalent metallic salts such as ferric chloride, ferrous sulfate, and aluminum sulfate. Dilute hydrochloric acid has also been found to be effective, but the gels are not as strong as those produced with the trimetallic salts.

Solutions of CMC or other alkali metal carboxyl methyl cellulose and a suitable gelling agent are brought together in a mixing nozzle situated just above a layer of deposited silt. The gel is deposited as a continuous layer on top of the silt. It effectively immobilizes the fine particle sediment. The strength and thickness of the gel can can be varied by changes in solution concentrations and the ratio of reactants. The system can be used in both fresh and salt water environments.

Certain polymers known as hydrogels have also been found to be effective silt stabilizers. Hydrogels are water-soluble polymers that are crosslinked to render them insoluble. When added to water, the main chains swell and become partially solvated. However, true solution cannot be obtained due to the crosslinking. As a result the dry polymer swells in water to a significantly larger volume. At saturation the swollen polymer is gel-like in consistency. The gel can range from a soft and jelly-like mass to a hard, almost rubbery solid.

Hydrogels can be derived from many water-soluble polymers, including sodium acrylate/acrylamide copolymers, acrylamide, dextran, self-complexing polysaccharides, etc. Several of them have been found to be preferred silt stabilizers. For example, a sodium acrylate/acrylamide copolymer crosslinked with methylene-bis-acrylamide was gelled on top of a precipitated silt layer. Turbulence in the water above the gel fails to disturb the silt.

The hydrogel can be incorporated above the silt in several ways. If the material is loosely crosslinked, it is possible to pump the saturated gel directly to the site. An alternate procedure is to encapsulate the dry powder in a capsule, the wall material of which is a water-soluble material such as gelatin. The pellets are distributed on the ocean floor. The wall material slowly dissolves, exposing the powder to the water. The powder then absorbs the water and expands to form a stabilizing gel.

As with other silt stabilizers, the hydrogels can be used in both fresh and salt water environments.

Preliminary laboratory tests with sodium alginate on a beaker scale were very encouraging. However, they revealed several deficiencies in the system that required correction:

(1) The specific gravity of the pure gel was nearly the same as the water media. The gel could best be described as neutrally buoyant and had a distinct tendency to float in salt water (2) The gel exhibited a high degree of shrinkage during formation (3) When mixed with ocean water the dissolved mineral content of that water resulted in partial gelation, or sharp increase in solution viscosity. High viscosities could not be tolerated because of the high horsepower required to pump the solutions to the ocean floor. Hence, the surface mixing stations would have to be equipped with large quantities of fresh or deionized water.

(4) Separately applied strips of gel could not be bonded to one another. Hence, complete coverage of large areas would require a certain degree of overlap and/or cross hatching.

Various grades of alginates, gelling agents, and fillers were examined to eliminate or reduce the problems listed above. More specifically the problems were specific gravity control, gelation, and application. The major conclusions drawn are summarized as follows:

POLYMER

The following grades of sodium alginate were evaluated:

| Grade | Average viscosity, centipoise | |
|---|---|---|
| | 1 percent solution | 2 percent solution |
| Kelgin XL ® | 30 | 160 |
| Kelco-Gel LV ® | 50 | 250 |
| Kelco-Gel HV ® | 350 | 3,500 |
| Keltex ® | 800 | 10,000 |

NOTE.—® Trademark of Kelco Company for various sodium alginate solutions.

GELLING AGENTS

Gelling agents evaluated during the study included dilute hydrochloric acid (HCl), calcium chlorided ($CaCl_2$), a calcium citrate [$Ca(C_6H_5O_7)_2$], and calcium sulfate ($CaSO_4$).

FILLERS

A number of inorganic fillers were added to the sodium alginate system to increase gel specific gravity. Evaluated were titanium dioxide ($TiO_2$), barium sulfate ($BaSO_4$), iron powder, Georgia kaolin, Alundum, calcium pyrophosphate ($Ca_2P_2O_7$), calcium silicate ($CaSO_3$), lead oxide (PbO), and metallic lead powder.

SPECIFIC GRAVITY

Most of the filler systems were found to be effective in concentrations ranging from 20 to as high as 400 percent of the polymer content. Factors limiting the quantity of filler were (1) the increase in viscosity of the polymer solution and (2) the ability to adequately disperse the filler without precipitation.

The most satisfactory results were obtained with $TiO_2$ and $Ba(SO_4)$. Alundum and talc also looked promising during beaker experiments. Alundum, however, was found to be too abrasive for pumping equipment.

HCl was adopted as the preferred gelling agent because of reaction between the acid and filler PbO metallic lead powder could not be added to algin solutions without causing premature gelation.

Uniform dispersion of filler in the polymer solution was enhanced by using a wetting agent. A convenient and effective material for this purpose was sodium hexametaphosphate $(NaPO_3)_6$.

POLYMER GELATION

Algin-HCl

HCl was an effective gelling agent in laboratory experiments for all the algin polymers except Kelgin XL. Hard, rubbery gels were obtained with the other polymers but with Kelgin only soft pastes could be developed. The Algin-HCl system was recommended for evaluation in tank tests.

Algin-$CaCl_2$ $CaCl_2$ gels were extremely strong and tough, and formed instantly on contact between the algin and calcium solutions. The quality of these gels resulted in a recommendation that $CaCl_2$ be evaluated in tank tests. $CaCl_2$ was effective with all of the candidate alginate polymers.

Algin-$Ca_3(C_6H_5O_7)_2$ $Ca_3(C_6H_5O_7)_2$ was evaluated because of its limited solubility in water. Supersaturated solutions of this chemical caused Kelco Gel HV to precipitate in about 2 hours.

Algin-$CaSO_4$ $CaSO_4$, like $Ca_3(C_6H_5O_7)_2$, has limited solubility in water. However, it is a considerably more active material and will produce a gel several seconds after mixing with the polymer. These two characteristics—low solubility and rapid reaction with alginate—provide a mechanism by which gel time can be partially controlled. This is accomplished by adding a quantity of sequestering agent $(NaPO_3)_6$ to the alginate solution. This mix is then combined with a supersaturated solution of $CaSO_4$. The dissolved $CaSO_4$ is inactivated by the sodium hexametaphosphate and before gelation can take place additional $CaSO_4$ must go into solution. The length of this time delay can thus be regulated by the ratio of catalyst ($CaSO_4$) to sequestering agent.

The feasibility of using the above approach was briefly demonstrated. Different ratios of $CaSO_4$ and $(NaPO_3)_6$ were combined with Kelco Gel HV solution. Gel times varied from essentially zero to up to 4 minutes, and in some cases gelation was completely prevented.

TANK TESTS

One foot wide and three foot wide strips of alginate polymers were laid down in continuous strips in large tanks holding sea water and silt.

Shrinkage of the alginate coating is a problem. Shrinkage depends to a great extent upon the type of gelling agent. For example, calcium chloride generally results in a high degree of shrinkage. The gel, dyed black to improve visibility, shrank to less than half of its original width. The gel, was extremely tough and is typical of sodium alginate-calcium chloride coatings.

The gel prepared from Keltex (1.5 percent solution) and dilute (2.0 percent) hydrochloric acid was quite strong, although not as rough as that produced with calcium chloride, however, shrinkage was less than 10 percent.

A series of experiments with different fillers resulted in the selection of $TiO_2$ at a loading of 6 percent of polymer solution weight. The specific gravity of the resulting gel is 1.06, sufficient to prevent flotation in salt water. Higher filler loadings caused several undesirable effects. The solution viscosity became too high and gelation by HCl was retarded.

The final system consisted of two solutions, the first containing Keltex (1.5 percent) and $TiO_2$ (6.0 percent). The gelling agent was 5.0 percent HCl. This system produces a gel of exceptional characteristics. A continuous section was dispensed from a three-foot nozzle system. The gel is bright white, easily visible in water. It is quite strong and will support a 10-inch Crescent wrench, a ball-peen hammer, and a pipe wrench, without breaking. The film will not break up in a ½ knot water current. After one month in water the coating retained its integrity although it showed some signs of softening. The system is workable between 32 and 80° F. and pressure effects on the chemical system are not anticipated.

What is claimed is:
1. The method of stabilizing silt on the bottom of a body of water comprising: introducing a water-soluble polymer as a layer onto the surface of said silt and subsequently rendering said layer of water insoluble in the form of a gelatinous precipitate.
2. The method of claim 1 wherein said polymer contains from 20 to 400 percent filler particles.
3. The method of claim 1 wherein said water-soluble polymer is mixed with a gelation agent just prior to being deposited with said gelation agent disposed to convert said polymer to a water-insoluble gelatinous precipitate during and after deposition onto said silt.
4. The method of claim 3 wherein said polymer is at least one material selected from the group of alginates, polyvinyl acetate-crotonic acid copolymers and alkali metal carboxyl methyl cellulose.
5. The method of claim 3 wherein said polymer is at least one material selected from the group of sodium alginate and potassium alginate and said agents consists of HCl or calcium citrate.
6. The method of claim 3 wherein said polymer is a polyvinyl acetate-crotonic acid copolymer and said agent in a material that is disposed to reduce the pH of said polymer to below 7.
7. The method of claim 3 wherein said polymer is an alkali metal carboxyl methyl cellulose and said agent is a trivalent metallic salt or hydrochloric acid.
8. The method of claim 1 wherein said polymer is a hydrogel.
9. The method of claim 8 wherein said hydrogel is at least one material selected from the group of sodium acrylate/acrylamide copolymers, acrylamide, dextran, and self-complexing polysaccharides.

References Cited
UNITED STATES PATENTS

| | | | |
|---|---|---|---|
| 2,319,020 | 5/1943 | Van Leeuwen | 61—36 |
| 2,439,833 | 4/1948 | Wagner | 166—294 |
| 2,838,466 | 6/1958 | Padbury et al. | 61—36 X |
| 3,118,832 | 1/1964 | Katzer et al. | 61—36 X |
| 3,208,524 | 9/1965 | Horner et al. | 166—294 |
| 3,223,163 | 12/1965 | Koch et al. | 61—36 |
| 3,286,475 | 11/1966 | Adams | 61—36 |
| 3,298,982 | 1/1967 | Glenn et al. | 61—36 X |
| 3,312,069 | 4/1967 | Jorda | 61—36 X |
| 3,418,813 | 12/1968 | Dillon | 61—1 |

STEPHEN J. NOVOSAD, Primary Examiner

UNITED STATES PATENT OFFICE
CERTIFICATE OF CORRECTION

Patent No. 3,611,732            Dated October 12, 1971

Inventor(s)      Michael M. Epstein

It is certified that error appears in the above-identified patent and that said Letters Patent are hereby corrected as shown below:

Column 5, line 34, after "layer" delete "of"

Signed and sealed this 7th day of March 1972.

(SEAL)
Attest:

EDWARD M. FLETCHER, JR.      ROBERT GOTTSCHALK
Attesting Officer             Commissioner of Patents